(12) United States Patent
Kim

(10) Patent No.: US 6,283,541 B1
(45) Date of Patent: Sep. 4, 2001

(54) REAR ROOF RAIL REINFORCEMENT STRUCTURE FOR AUTOMOBILE

(75) Inventor: Byung-Jin Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/611,850

(22) Filed: Jul. 7, 2000

(30) Foreign Application Priority Data

Dec. 21, 1999 (KR) .................................................. 99-59784

(51) Int. Cl.[7] .................................................. B62D 25/06
(52) U.S. Cl. ........................ 296/210; 296/203.04; 296/29
(58) Field of Search .............................. 296/195, 203.01, 296/203.04, 210, 29

(56) References Cited

U.S. PATENT DOCUMENTS

| | | | |
|---|---|---|---|
| 3,833,254 | * 9/1974 | Renner | 296/210 |
| 5,318,338 | * 6/1994 | Ikeda | 296/210 |
| 6,126,232 | * 10/2000 | Nakano | 296/210 |

* cited by examiner

Primary Examiner—Dennis H. Pedder
(74) Attorney, Agent, or Firm—Christie, Parker & Hale, LLP

(57) ABSTRACT

A rear roof rail reinforcement structure for automobile wherein a passage between an inner side panel at a corner side of the tailgate and an outer side panel is blocked to provide a reinforcing force, such that, in case an automobile is parked on a block of a footpath with only one wheel, a torsional stress is not applied to the tailgate to thereby facilite opening and closing of tailgate, and vibration generated from a running automobile is blocked by the passage to prevent in advance the noisy sound resounding phenomenon from being transmitted to a pillar panel, the rear roof rail reinforcement structure for automobile, the rear roof rail for automobile where an inner side panel and an outer side panel are detachably formed at a predetermined space therebetween, a rear roof lower rail is overlapped by and welded to the inner side panel and the outer side panel is overlapped by and welded to a rear roof upper rail and a roof panel, wherein the rear roof lower rail is bent at a tip end thereof and welded to connect the inner side panel and the outer side panel respectively, and comprises a reinforcement for blocking a passage formed between the inner side panel and the outer side panel.

2 Claims, 2 Drawing Sheets

REAR ROOF RAIL REINFORCEMENT STRUCTURE FOR AUTOMOBILE

BACKGROUND OF THE INVENTION

1. Field of the Invention

The present invention relates to an automobile, and more particularly to a rear roof rail reinforcement structure for automobile having a tailgate for reinforcing a rear roof rail.

2. Description of the Prior Art

A rear roof rail reinforcement structure for automobile according to the prior art is constructed such that a rear end of a rear roof lower rail 10 at a corner 1 connected to a tailgate (not shown) and an upper tip end of an inner side panel 20 are correspondingly overlapped and spot-welded, while, at outer sides of the rear roof lower rail 10 and the inner side panel 20, a tip end of a rear roof upper rail 30 and a tip end of outer side panel 40 are correspondingly overlapped, and, at an outer side of the rear roof upper rail 30, a tip end of roof panel 50 is overlapped and spot-welded to an overlapped portion between the rear roof upper rail 30 and the outer side panel 40, as illustrated in FIGS. 1 and 2.

At this time, a through hole 21 is formed at one side of the inner side panel 20 for an inner welding gun 70 to be inserted from an inner side of the inner side panel 20 toward an overlapped part where a tip end of the outer side panel 40, tip ends of rear roof upper rail 30 and roof panel 50 are upper rail 30 toward an overlapped part where tip ends of the rear roof lower rail 10 and inner side panel 20 are correspondingly meet.

Unexplained reference numeral 60 in the drawings is a pillar panel connected by rear roof lower rail 10 and inner side panel 20.

However, there is a problem in the conventional rear roof rail reinforcement structure for automobile thus constructed in that a passage (a) is opened between the inner side panel 20 and the outer side panel 40 at the corner 1 of tailgate, as illustrated in FIG. 2, such that, by way of example, when one wheel of an automobile is parked on a block of a footpath, the tailgate is twisted not to be opened or closed because opening of the tailgate receives torsional stress, and vibration generated when an automobile is running cannot be blocked at the passage (a) to be transmitted to the pillar panel 60, thereby causing a noisy sound resounding phenomenon.

SUMMARY OF THE INVENTION

The present invention is disclosed to solve the aforementioned problems and it is an object of the present invention to provide a rear roof rail reinforcement structure for automobile constructed and adapted to reinforce a corner for an opening of tailgate not to receive torsional stress during parking as above, and to facilitate opening and closing of the tailgate. It is another object of the present invention to isolate the vibration generated while an automobile is running at a passage of a corner side, thereby preventing in advance a noisy sound resounding phenomenon from being transmitted to a pillar panel.

In accordance with the objects of the present invention, there is provided a rear roof rail reinforcement structure for automobile, the rear roof rail for automobile where an inner side panel and an outer side panel are detachably formed at a predetermined space therebetween, a rear roof lower rail is overlapped by and welded to the inner side panel and the outer side panel is overlapped by and welded to a rear roof upper rail and a roof panel, wherein the rear roof lower rail is bent at a tip end thereof and welded to connect the inner side panel and the outer side panel respectively, and comprises a reinforcement for blocking a passage formed between the inner side panel and the outer side panel.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to FIGS. 3 and 4.

Figure 1:
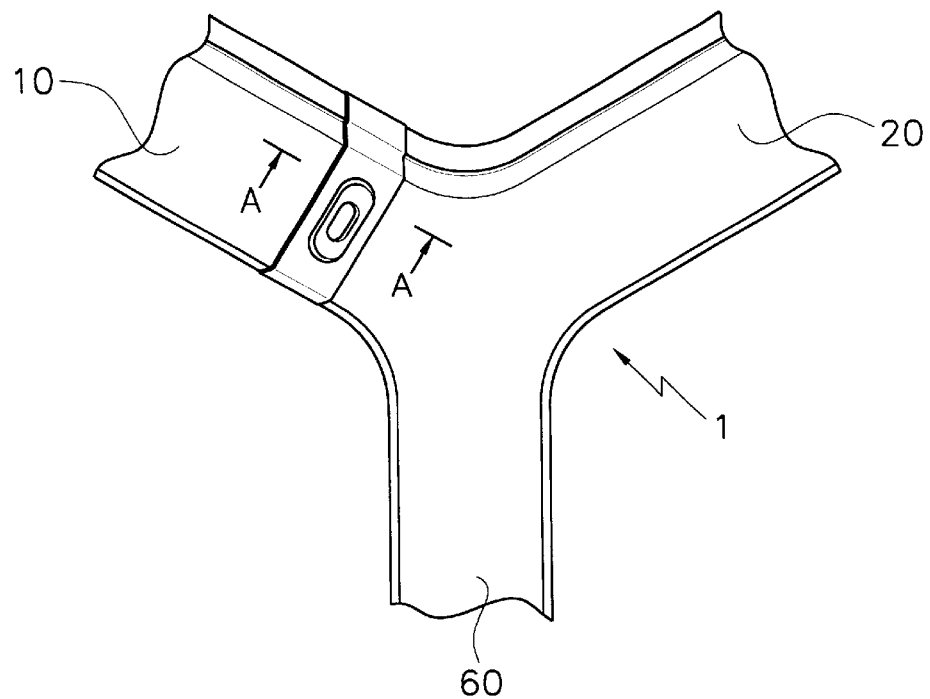
FIG. 1 is a schematic diagram for illustrating a connected state between a rear roof upper rail for automobile and an inner side panel according to the prior art.
Figure 2:
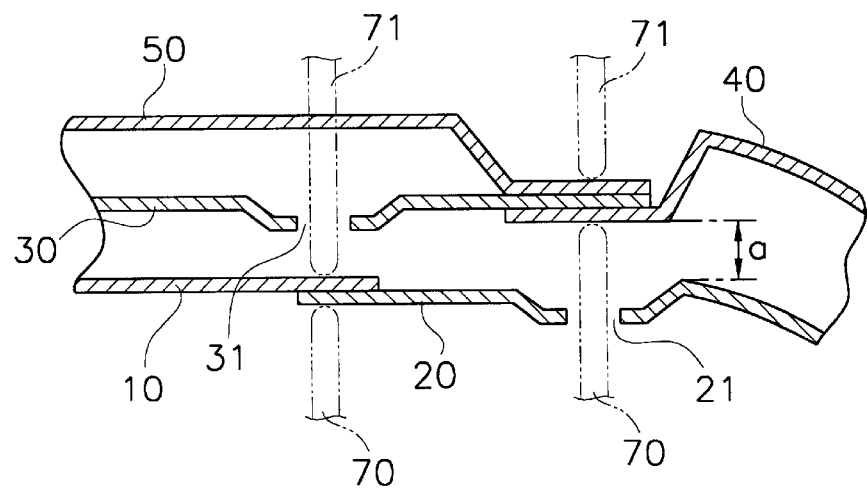
FIG. 2 is a sectional view for illustrating a rear roof rail reinforcement structure relative to line A—A in FIG. 1.

Through the drawings, like reference numerals are used for designation of like or equivalent parts or portions as in FIGS. 1 and 2 and redundant references will be omitted for simplicity of illustration and explanation.

Figure 3:
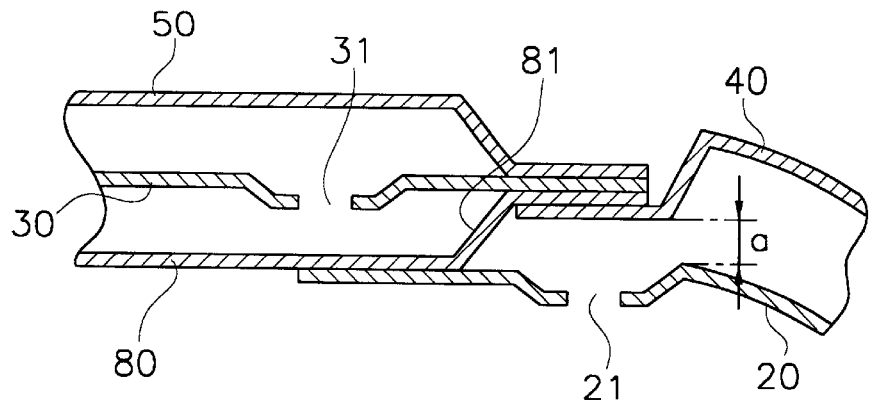
FIG. 3 is a sectional view for illustrating a rear roof rail reinforcement structure according to the present invention.

A rear roof rail reinforcement structure for automobile according to the present invention is constructed such that a rear end of a rear roof lower rail 80 at a corner 1 connected to a tailgate (not shown) and an upper tip end of an inner side panel 20 are correspondingly overlapped and spot-welded, while, at outer sides of the rear roof lower rail 80 and the inner side panel 20, a tip rear end of outer side panel 40 is sequentially overlapped and spot-welded by a tip end of rear roof lower rail 80, a tip end of a rear roof upper rail 30 and a tip end of a roof panel 50, as illustrated in FIG. 3.

A t this time, a through hole 21 is formed at one side of the inner side panel 20, such that an inner welding gun 70 can touch an inner tip surface of the outer side panel 40 by piercing the inner side panel 20, and another through hole 31 is form ed at one side of the rear roof upper rail 30, such that an outer welding gun 71 can touch an external surface of the rear roof lower rail 80 by piercing the rear roof upper rail 30.

Furthermore, the rear roof lower rail 80 is correspondingly overlapped and welded at an inner surface thereof distanced at a predetermined space from a tip end thereof by a tip end of the inner side panel 20, while the tip end thereof is bent outwardly an d is overlapped and welded between a tip end of the outer side panel 40 and a tip end of the rear roof upper rail 30.

At this location, a reinforcement 81 for blocking a passage (a) formed between the inner side panel 20 and the outer side panel 40 when the inner side panel 20 and the outer side panel 40 are adhered and welded at two spots thereof, is form ed between the tip end and the inner surface.

Now, operational effect of the present invention thus constructed will be described.

First of all, the inner surface distanced at a predetermined space from a tip end of the rear roof lower rail 80 is made to correspondingly overlap with a tip end of the inner side panel 20, and an external tip end of the rear roof lower rail 80 is also made to adhere to a tip end of the rear roof upper rail 30 from an external side of the rear roof lower rail 80, while an inner tip surface of the rear roof lower rail 80 is caused to adhere to a tip end of the outer side panel 40.

Figure 4A:
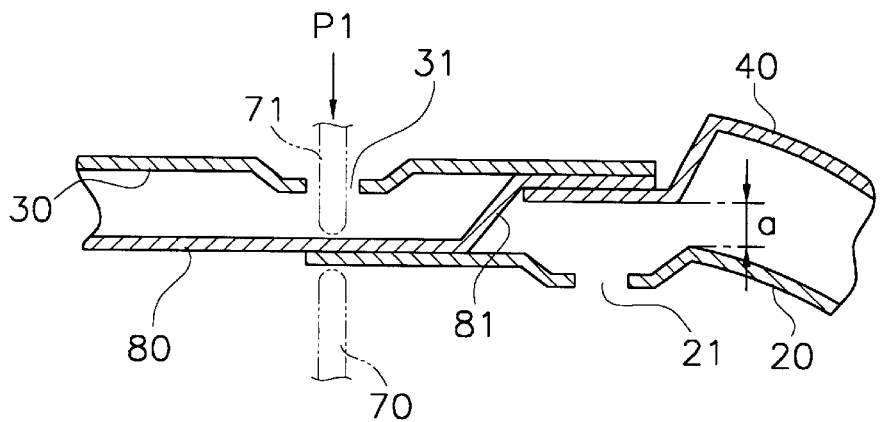
FIG. 4a is a sectional view for illustrating a first welded state of rear roof rail reinforcement structure according to the present invention.
Figure 4B:
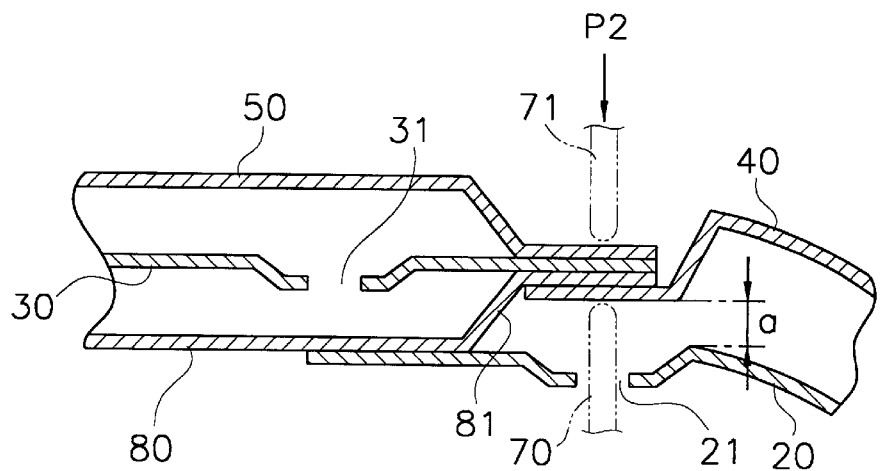
FIG. 4b is a sectional view for illustrating a second welded state of rear roof rail reinforcement structure according to the present invention.

Then, as illustrated in FIG. 4a, the outer welding gun 71 is inserted into the through hole 31 positioned at a predetermined position of the rear roof upper rail 30 from the rear roof upper rail 30 to allow same to contact an external surface of the rear roof lower rail 80, while the inner welding gun 70 is made to position on a perpendicular line (P1) corresponding to the outer welding gun 71 from the inner tip end of the inner side panel 20 and to simultaneously contact an inner surface of the inner side panel 20. At this time, a current is applied to the inner and outer welding gun 70 and 71 to locally heat while corresponding pressure is applied to the inner and outer welding gun 70 and 71 for spot-welding.

Furthermore, the tip of the rear roof lower rail 80 and the tip end of the rear roof upper rail 30 sequentially overlapped to an outer tip surface of the outer side panel 40 is additionally overlapped by a tip end of roof panel 50, where the outer welding gun 71 is made to contact an outer tip surface of the roof panel 50 while the inner welding gun 70 is made to position on a perpendicular line (P2) corresponding to the outer welding gun 71 from the external side of the inner side panel 20 and is made to be inserted into the through hole 21 arranged at a predetermined position of the inner side panel 20 to contact the inner surface of the outer side panel 40.

Successively, a current is applied to the inner and the outer welding gun 70 and 71 to locally heat while corresponding pressure is given to the inner and outer welding gun 70 and 71 for spot-welding.

At this time, the reinforcement 81 bent and positioned at a predetermined place of the rear roof lower rail 80 blocks the passage (a) formed between the inner side panel 28 and the outer side panel 40 and simultaneously connects the inner side panel 20 and the outer side panel 40 when both tip ends of the rear roof lower rail 80 are respectively overlapped on the inner side panel 20 and the outer side panel 40.

Accordingly, the reinforcement 81 serves to connect the inner side panel 20 and the outer side panel 40 to block the passage (a) formed therebetween such that the opening of the tailgate is not affected by torsional stress while the noisy sound resounding phenomenon generated by the blocked passage (a) is avoided in advance.

As apparent from the foregoing, there is an advantage in the rear roof rail reinforcement structure for automobile in that a passage between an inner side panel and an outer side panel at a corner side of the tailgate is blocked to provide a reinforcing force, such that, in case an automobile is parked on a block of a footpath with only one wheel, a torsional stress is not applied to the tailgate to thereby facilite opening and closing of tailgate.

There is another advantage in that vibration generated from a running automobile is blocked by the passage to prevent in advance the noisy sound resounding phenomenon from being transmitted to a pillar panel.

What is claimed is:

1. A rear roof rail reinforcement structure for automobile, the rear roof rail for automobile where an inner side panel and an outer side panel are detachably formed at a predetermined space therebetween, a rear roof lower rail is overlapped by and welded to the inner side panel and the outer side panel is overlapped by and welded to a rear roof upper rail and a roof panel, wherein the rear roof lower rail is bent at a tip end thereof and welded to connect the inner side panel and the outer side panel respectively, and comprises a reinforcement for blocking a passage formed between the inner side panel and the outer side panel.

2. The structure as defined in claim 1, wherein the rear roof lower rail is correspondingly overlapped and welded at an inner surface thereof distanced at a predetermined space from a tip end thereof by a tip end of the inner side panel, while the tip end thereof is bent outwardly and is overlapped and welded between a tip end of the outer side panel and a tip end of the rear roof upper rail.

\* \* \* \* \*